US012799274B2

(12) United States Patent
Shi et al.

(10) Patent No.: US 12,799,274 B2
(45) Date of Patent: Nov. 17, 2026

(54) RIGID NON-ISOCYANATE POLYURETHANE FOAM AND PREPARATION METHOD THEREFOR

(71) Applicant: Wuhan Institute of Technology, Wuhan (CN)

(72) Inventors: Lijuan Shi, Wuhan (CN); Qun Yi, Wuhan (CN); Yi Huang, Wuhan (CN); Qiuxian Hong, Wuhan (CN); Mingyue Qiu, Wuhan (CN); Haonan Wu, Wuhan (CN); Bohao Li, Wuhan (CN); Hengjun Chen, Wuhan (CN)

(73) Assignee: Wuhan Institute of Technology, Wuhan (CN)

( * ) Notice: Subject to any disclaimer, the term of this patent is extended or adjusted under 35 U.S.C. 154(b) by 582 days.

(21) Appl. No.: 18/241,913

(22) Filed: Sep. 4, 2023

(65) Prior Publication Data

US 2024/0182643 A1 Jun. 6, 2024

(30) Foreign Application Priority Data

Dec. 2, 2022 (CN) ........................ 202211535119.X

(51) Int. Cl.

*C08G 71/04* (2006.01)
*C08J 9/08* (2006.01)
(Continued)

(52) U.S. Cl.

CPC ................ *C08G 71/04* (2013.01); *C08J 9/08* (2013.01); *C08J 9/141* (2013.01); *C08G 2101/00* (2013.01); *C08G 2110/0025* (2021.01); *C08J 2203/02* (2013.01); *C08J 2203/14* (2013.01); *C08J 2205/10* (2013.01)

(58) Field of Classification Search

CPC ................ C08G 71/04; C08G 2101/00; C08G 2110/0025; C08G 2110/0066; C08J 9/08; C08J 9/141; C08J 2203/02; C08J 2203/14; C08J 2205/10; Y02P 20/54

See application file for complete search history.

(56) References Cited

U.S. PATENT DOCUMENTS

| | | | | |
|---|---|---|---|---|
| 2004/0230009 A1* | 11/2004 | Wilkes | C11C 3/00 525/327.3 |
| 2021/0261772 A1* | 8/2021 | Zeller | C08G 71/02 |

FOREIGN PATENT DOCUMENTS

| | | | |
|---|---|---|---|
| CN | 101812175 A * | 8/2010 | C08G 71/04 |
| WO | WO-03028644 A2 * | 4/2003 | C08G 59/1405 |

* cited by examiner

*Primary Examiner* — K. Boyle

(74) *Attorney, Agent, or Firm* — Bayramoglu Law Offices LLC

(57) ABSTRACT

A rigid non-isocyanate polyurethane foam and a preparation method therefor are provided. According to the present application, a rigid epoxide is firstly reacted with carbon dioxide to obtain rigid cyclic carbonate, then the product is reacted with diamine to obtain rigid non-isocyanate polyurethane, and the rigid non-isocyanate polyurethane is mixed with a foaming agent for foaming to obtain rigid non-isocyanate polyurethane foam. The present application improves the mechanical property of non-isocyanate polyurethane by optimizing the structures and groups of raw materials; according to the present application, mild reaction conditions such as atmospheric pressure and low temperature are used, and the amounts of reactants and foaming agents are adjusted, so that the reaction is significantly enhanced, and an excellent foaming effect is achieved.

11 Claims, 1 Drawing Sheet

(51) Int. Cl.
*C08J 9/14* (2006.01)
*C08G 101/00* (2006.01)

RIGID NON-ISOCYANATE POLYURETHANE FOAM AND PREPARATION METHOD THEREFOR

CROSS REFERENCE TO THE RELATED APPLICATIONS

This application is based upon and claims priority to Chinese Patent Application No. 202211535119.X, filed on Dec. 2, 2022, the entire contents of which are incorporated herein by reference.

TECHNICAL FIELD

The present application relates to the technical field of the preparation of polyurethane material, and in particular to rigid non-isocyanate polyurethane foam and its preparation method therefor.

BACKGROUND

Polyurethane materials have excellent physical and chemical properties, and can be widely used in the fields of plastic production, foam production, and the like. In recent years, the consumption scale of polyurethane has been increasing year by year, and the polyurethane has a good evaluation on the market and wide market prospect. In the production process of the conventional polyurethane, the amine is usually converted into isocyanate by using a phosgene method. However, phosgene is extremely toxic, and has serious defects to human bodies after being inhaled for a long time. Meanwhile, the isocyanate products are easy to react with water, which is not beneficial to the preparation of polyurethane and the storage and transportation of isocyanate.

Non-isocyanate polyurethane based on the reaction of cyclic carbonate and amine is an ideal alternative material, which not only has more excellent performance than isocyanate and can be applied to a plurality of fields such as adhesives and foam materials, but also has milder production conditions with lower energy consumption. Nevertheless, the cyclic carbonate products still suffer from deficiencies such as few in variety, complex synthesis process, and adverse synthesis factors such as high temperature and high pressure, thus slowing down the industrial development process of the non-isocyanate polyurethane. In addition, the current raw materials for the synthesis of non-isocyanate polyurethane are mainly configuration-flexible cyclic carbonate and configuration-flexible diamine, so that the non-isocyanate polyurethane has a high viscosity and poor mechanical properties. As a result, the development and the application of the non-isocyanate polyurethane in the fields of heat-insulating foams are greatly limited.

Therefore, how to provide a preparation method for rigid non-isocyanate polyurethane foam that can improve the mechanical strength of the non-isocyanate polyurethane foam while reducing the production cost is a difficult problem to be solved urgently.

SUMMARY

In view of this, the present application provides rigid non-isocyanate polyurethane foam and its preparation method therefor, so as to solve the problem of low mechanical strength of foam materials synthesized by non-isocyanate polyurethane in the existing market.

In order to achieve the above objective, the present application uses the following technical solutions.

A preparation method for rigid non-isocyanate polyurethane foam, comprising the following steps:

1) reacting a rigid epoxide with carbon dioxide under the presence of a catalyst to obtain a rigid cyclic carbonate;
2) reacting the rigid cyclic carbonate with rigid diamine to obtain a rigid non-isocyanate polyurethane; and
3) mixing the rigid non-isocyanate polyurethane with a foaming agent for foaming to obtain a rigid non-isocyanate polyurethane foam.

Preferably, in step 1), the reaction is performed at a temperature of 25-50° C. for 2-12 h, and the molar ratio of the rigid epoxide to carbon dioxide is 1:1.2-1.5, wherein the mass ratio of the catalyst to the rigid epoxide is 1:50-1500.

Preferably, the rigid epoxide comprises one or more of epoxycyclohexane, styrene oxide, 2-phenylpropylene oxide, epoxidized soybean oil, ethyl phenylglycidate, and 1,2-epoxybutane.

Preferably, in step 1), the catalyst is a supramolecular poly(ionic liquid) catalyst; and the preparation method comprises the following steps: firstly, mixing a solution of 1-vinyl-3-propylamino imidazolium bromide with azobisisobutyronitrile, performing polymerization reaction to obtain amino-functionalized poly(ionic liquid), and then mixing the amino-functionalized poly(ionic liquid) with zinc chloride to obtain the supramolecular poly(ionic liquid) catalyst.

Preferably, the mass ratio of 1-vinyl-3-propylamino imidazolium bromide to azobisisobutyronitrile is 100:1-3, wherein the molar ratio of the 1-vinyl-3-propylamino imidazolium bromide to zinc chloride is 1:1-4, and the molar concentration of the solution of 1-vinyl-3-propylamino imidazolium bromide is 0.5-2 mol/L; and the polymerization reaction is performed at a temperature of 60-100° C. for 8-12 h.

Preferably, in step 2), the molar ratio of the rigid cyclic carbonate to the rigid diamine is 0.1-3:1, and the reaction is performed at a temperature of 25-70° C. for 0.5-3 h.

Preferably, the rigid diamine comprises one or more of p-phenylenediamine, hexanediamine, ethylenediamine, isophorone diamine, p-aminodiphenylmethane, p-aminodiphenylethane, 1,5-diaminopentane, and diaminodiphenylmethane.

Preferably, in step 3), the molar ratio of the foaming agent to the rigid diamine is 0.01-0.5:1, and the foaming is performed for 1-5 h at a temperature of 20-70° C.

Preferably, the foaming agent comprises one or more of cyclopentane, isopentane, carbon dioxide, sodium bicarbonate, polymethylhydrosiloxane, and pentafluorobutane.

Another objective of the present application is to provide a rigid non-isocyanate polyurethane foam prepared by the above preparation method.

It can be known from the technical solutions that, compared with the previous technologies, the present application has the following advantages:

1. The present application has a mild reaction condition, and can obtain rigid polyurethane material through two-step reaction under atmospheric pressure and low temperatures;
2. The catalyst is an independently developed catalyst and is obtained by assembly in aqueous solution at room temperature, and the mild preparation condition and low cost make it suitable for large-scale production and application; and
3. The non-isocyanate polyurethane foam with adjustable rigidity is generated by optimizing the structures of the raw materials, and the mechanical property of the non-isocyanate polyurethane is significantly improved.

BRIEF DESCRIPTION OF THE DRAWINGS

In order to more clearly illustrate the technical solutions in the examples of the present application or in the prior art, the drawings required to be used in the description of the examples or the prior art are briefly introduced below. It is obvious that the drawings in the description below are merely examples of the present application, and those of ordinary skill in the art can obtain other drawings according to the drawings provided without creative efforts.

DETAILED DESCRIPTION OF THE EMBODIMENTS

Figure 1A:
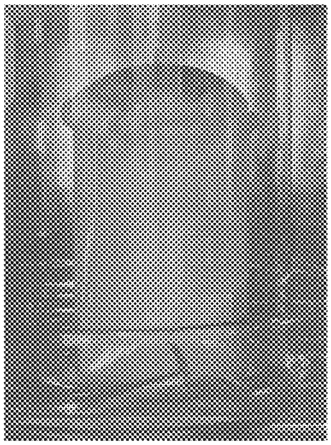
FIGS. 1A-1C are rigid non-isocyanate polyurethane foam prepared in Example 3.

The present application provides a preparation method for rigid non-isocyanate polyurethane foam, comprising the following steps:

1) reacting a rigid epoxide with carbon dioxide under the presence of a catalyst to obtain a rigid cyclic carbonate;
2) reacting the rigid cyclic carbonate with rigid diamine to obtain a rigid non-isocyanate polyurethane; and
3) mixing the rigid non-isocyanate polyurethane with a foaming agent for foaming to obtain a rigid non-isocyanate polyurethane foam.

In the present application, in step 1), the reaction temperature is 25-50° C., and specifically may be 26° C., 28° C., 30° C., 35° C., 40° C., and 45° ° C.; the reaction time is 2-12 h, and specifically may be 4 h, 5 h, 6 h, 8 h, and 10 h; the molar ratio of the rigid epoxide to the carbon dioxide is 1:1.2-1.5, preferably 1:1.3-1.4, and more preferably 1:1.35; and the mass ratio of the catalyst to the rigid epoxide is 1:50-1500, preferably 1:100-1200, more preferably 1:400-1000, and further preferably 1:600.

In the present application, the rigid epoxide comprises one or more of epoxycyclohexane, styreneoxide, 2-phenylpropylene oxide, epoxidized soybean oil, ethyl phenylglycidate, and 1,2-epoxybutane.

In the present application, in step 1), the catalyst is a supramolecular poly(ionic liquid) catalyst; and the preparation method comprises the following steps: firstly, mixing a solution of 1-vinyl-3-propylamino imidazolium bromide with azobisisobutyronitrile, performing polymerization reaction to obtain amino-functionalized poly(ionic liquid), and then mixing the amino-functionalized poly(ionic liquid) with zinc chloride to obtain the supramolecular poly(ionic liquid) catalyst.

In the present application, the mass ratio of 1-vinyl-3-propylamino imidazolium bromide to azobisisobutyronitrile is 100:1-3, and specifically may be 100:1.2, 100:1.4, 100:1.5, 100:1.6, 100:1.8, 100:2, 100:2.2, 100:2.4, 100:2.5, 100:2.6, and 100:2.8; and the molar ratio of 1-vinyl-3-propylamino imidazolium bromide to zinc chloride is 1:1-4, and specifically may be 1:1.2, 1:1.5, 1:1.8, 1:2, 1:2.2, 1:2.5, 1:2.8, 1:3, 1:3.2, 1:3.5, and 1:3.8.

In the present application, the molar concentration of the solution of 1-vinyl-3-propylamino imidazolium bromide may be 0.5-2 mol/L, and specifically may be 0.6 mol/L, 0.8 mol/L, 1 mol/L, 1.2 mol/L, 1.4 mol/L, 1.5 mol/L, 1.6 mol/L, and 1.8 mol/L.

In the present application, the temperature of the polymerization reaction is 60-100° C., and specifically may be 65° C., 70° C., 75° C., 80° ° C., 85° ° C., 90° ° C., and 95° C.; the time of the polymerization reaction is 8-12 h, and specifically may be 9 h, 10 h, and 11 h.

In the present application, the amino-functionalized poly (ionic liquid) and zinc chloride are preferably mixed by stirring, wherein the stirring time is preferably 1-4 h, and specifically may be 1.5 h, 2 h, 2.5 h, 3 h, and 3.5 h, and the stirring speed is preferably 10-40 rpm, and specifically may be 12 rpm, 15 rpm, 20 rpm, 25 rpm, 30 rpm, and 35 rpm.

In the present application, in step 2), the molar ratio of the rigid cyclic carbonate to the rigid diamine is 0.1-3:1, preferably 0.5-2.5:1, more preferably 1-2:1, and further preferably 1.5:1; the reaction temperature is 25-70° C., and specifically may be 28° C., 30° C., 35° C., 40° C., 45° C., 50° C., 55° C., 60° C., and 65° C.; and the reaction time is 0.5-3 h, and specifically may be 0.8 h, 1 h, 1.5 h, 2 h, and 2.5 h.

In the present application, the rigid diamine comprises one or more of p-phenylenediamine, hexanediamine, ethylenediamine, isophorone diamine, p-aminodiphenylmethane, p-aminodiphenylethane, 1,5-diaminopentane, and diaminodiphenylmethane.

In the present application, in step 3), the molar ratio of the foaming agent to the rigid diamine is 0.01-0.5:1, preferably 0.05-0.4:1, more preferably 0.1-0.3:1, and further preferably 0.2:1; the time of the foaming reaction is 1-5 h, and specifically may be 1.5 h, 2 h, 2.5 h, 3 h, 3.5 h, 4 h, and 4.5 h; and the temperature of the foaming reaction is 20-70° C., and specifically may be 30° C., 40° ° C., 50° C., and 60° C.

In the present application, in step 3), the mixing is preferably mixing by stirring, wherein the stirring speed is 100-400 rpm, and specifically may be 120 rpm, 150 rpm, 180 rpm, 200 rpm, 220 rpm, 250 rpm, 280 rpm, 300 rpm, 350 rpm, and 380 rpm; the stirring temperature is 20-200° C., and specifically may be 40° C., 50° C., 60° C., 80° C., 100° C., 120° C., 140° C., 150° C., 160° C., and 180° C.; and the stirring time is 1-200 min, specifically may be 5 min, 10 min, 20 min, 50 min, 60 min, 80 min, 100 min, 120 min, 150 min, 160 min, and 180 min.

In the present application, the foaming agent comprises one or more of cyclopentane, isopentane, carbon dioxide, sodium bicarbonate, polymethylhydrosiloxane, and pentafluorobutane.

The present application further provides a rigid non-isocyanate polyurethane foam prepared by the preparation method.

The technical solutions in the examples of the present application will be clearly and completely described below. Apparently, the described examples are merely a part, rather than all of the examples of the present application. All other examples obtained by those of ordinary skill in the art based on examples of the present application without creative efforts shall fall within the protection scope of the present application.

Example 1

1-vinyl-3-propylamino imidazolium bromide was dissolved in deionized water to obtain a solution of 1-vinyl-3-propylamino imidazolium bromide with a concentration of 1 mol/L. Azobisisobutyronitrile (3% by mass of the monomer) serving as an initiator was added, and the mixture was subjected to polymerization at 70° C. for 8 h, and cooled to room temperature to obtain amino-functionalized poly(ionic liquid). Zinc chloride was added, the molar ratio of the amino-functionalized poly(ionic liquid) to zinc chloride was 1:1, and the mixture was stirred at room temperature and at 20 rpm for 1 h and centrifuged to collect a precipitate. The precipitate was dried under vacuum at a temperature of 60° C. to obtain a supramolecular poly(ionic liquid) catalyst.

The supramolecular poly(ionic liquid) catalyst (50 mg) and epoxidized soybean oil (54 mmol, 51.3 g) were added into a reaction vessel equipped with a balloon, and carbon dioxide was introduced into the balloon (the molar ratio of carbon dioxide to the epoxidized soybean oil was 1.25:1). The mixture was reacted at 40° C. and atmospheric pressure for 3 h to obtain a product. The product was subjected to separation and drying to finally obtain the cyclic carbonate prepared from the epoxidized soybean oil.

The cyclic carbonate (25 mmol, 28.2 g) obtained above and ethylenediamine (100 mmol, 0.6 g) were mixed and reacted at 25° C. for 0.5 h with stirring, then sodium bicarbonate (50 mmol, 4.2 g) was added and stirred at 50° ° C. for 1 h at 150 rpm, the stirred substance was transferred to a mold and heated to 70° C. for 3 h, and finally a rigid non-isocyanate polyurethane foam was obtained.

Example 2

The supramolecular poly(ionic liquid) catalyst (50 mg) prepared in Example 1 and styreneoxide (50 mmol, 6.0 g) were added into a reaction vessel equipped with a balloon, and carbon dioxide was introduced into the balloon (the molar ratio of carbon dioxide to the styreneoxide was 1.3:1). The mixture was reacted at 50° C. and atmospheric pressure for 3 h to obtain a product. The product was subjected to separation and drying to finally obtain the cyclic carbonate prepared from the styreneoxide.

The cyclic carbonate (100 mmol, 16.4 g) obtained above and diaminodiphenylmethane (100 mmol, 19.8 g) were mixed and reacted at 50° C. for 2 h with stirring, then cyclopentane (40 mmol, 2.8 g) was added and stirred at 60° C. for 2 h at 200 rpm, the stirred substance was transferred to a mold and heated to 70° C. for 5 h, and finally a rigid non-isocyanate polyurethane foam was obtained.

Example 3

The supramolecular poly(ionic liquid) catalyst (50 mg) prepared in Example 1 and epoxycyclohexane (40 mmol, 3.9 g) were added into a reaction vessel equipped with a balloon, and carbon dioxide was introduced into the balloon (the molar ratio of carbon dioxide to the epoxycyclohexane was 1.5:1). The mixture was reacted at 40° C. and atmospheric pressure for 4 h to obtain a product. The product was centrifuged to separate the catalyst and the corresponding cyclic carbonate, and the product was subjected to separation, drying and other treatments to finally obtain the cyclic carbonate prepared from the epoxycyclohexane.

The cyclic carbonate (200 mmol, 28.4 g) obtained above and 1,5-diaminopentane (100 mmol, 10.2 g) were added into a 250 ml beaker, and the mixture was reacted at 40° ° C. for 2 h with stirring; Then, sodium bicarbonate (40 mmol, 3.4 g) was added and stirred at 65° C. for 1 h at 100 rpm, the stirred substance was transferred to a mold, heated to 70° C. and reacted for 5 h, and finally a rigid non-isocyanate polyurethane foam was obtained.

Figure 1B:
Figure 1C:
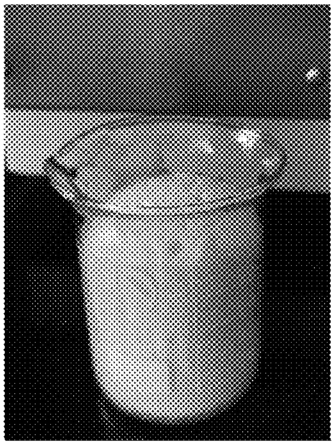

The rigid non-isocyanate polyurethane foam prepared in this example is shown in FIGS. 1A-1C.

Experiment Example 1

The properties of the rigid non-isocyanate polyurethane foam prepared in Examples 1 to 3 (sequentially corresponding to samples A, B, and C) were measured, and the standards and the results of the measurements are shown in Table 1.

TABLE 1

Structural properties of rigid non-isocyanate polyurethane foam

| | Sample A | Sample B | Sample C | Measurement method |
|---|---|---|---|---|
| Foam pore diameter/μm | 0.72 | 0.80 | 0.83 | Measured according to GB/T6342-1996 |
| Apparent density/kg · $m^{-3}$ | 275 | 290 | 368 | Measured according to GB/T6343-1995 |
| Strain (30%)/Pa | $2.2 \times 10^4$ | $2.8 \times 10^4$ | $3.5 \times 10^4$ | Measured according to ASTM D3574-05 |
| Thermal stability (Tg value)/° C. | 190 | 210 | 235 | Measured according to GB/T10295-1988 |
| Thermal conductivity/W/(m · K) | 12 | 15 | 20 | Measured according to GB/T10295-1988 |
| Percentage of close area/% | 88 | 90 | 92 | Measured according to GB/T10799-2008 |

It can be seen from Table 1 that the rigid non-isocyanate polyurethane foam prepared in Examples 1 to 3 is chemically resistant and high in thermal stability, has excellent waterproof and vapor barrier performance, and meantime, has good heat insulation performance, safety and non-toxicity.

The examples in the specification are all described in a progressive manner, and each example focuses on differences from other examples, and portions that are the same and similar between the examples may be referred to each other.

The above description of the disclosed examples enables those skilled in the art to implement or use the present application. Various modifications to these examples will be readily apparent to those skilled in the art, and the generic principles defined herein may be applied to other examples without departing from the spirit or scope of the present application. Thus, the present application is not intended to be limited to these examples shown herein but is to be accorded the broadest scope consistent with the principles and novel features disclosed herein.

What is claimed is:

1. A preparation method for a rigid non-isocyanate polyurethane foam, comprising the following steps:

1) reacting a rigid epoxide with carbon dioxide under a presence of a catalyst to obtain a rigid cyclic carbonate;

2) reacting the rigid cyclic carbonate with a rigid diamine to obtain a rigid non-isocyanate polyurethane; and 3) mixing the rigid non-isocyanate polyurethane with a foaming agent for foaming to obtain a rigid non-isocyanate polyurethane foam;

wherein in step 1), the reaction is performed at a temperature of 25-50° C. for 2-12 h, and the molar ratio of the rigid epoxide to the carbon dioxide is 1:(1.2-1.5), wherein the mass ratio of the catalyst to the rigid epoxide is 1:(50-1500).

2. The preparation method for the rigid non-isocyanate polyurethane foam according to claim 1, wherein the rigid epoxide comprises one or more of epoxycyclohexane, styreneoxide, 2-phenylpropylene oxide, epoxidized soybean oil, ethyl phenylglycidate, and 1,2-epoxybutane.

3. The preparation method for the rigid non-isocyanate polyurethane foam according to claim 1, wherein in step 1), the catalyst is a supramolecular poly(ionic liquid) catalyst; and the preparation method comprises the following steps: firstly, mixing a solution of 1-vinyl-3-propylamino imidazolium bromide with azobisisobutyronitrile to obtain a resulting mixture, performing a polymerization reaction on the resulting mixture to obtain an amino-functionalized poly(ionic liquid), and then mixing the amino-functionalized poly(ionic liquid) with zinc chloride to obtain the supramolecular poly(ionic liquid) catalyst.

4. The preparation method for the rigid non-isocyanate polyurethane foam according to claim 2, wherein in step 1), the catalyst is a supramolecular poly(ionic liquid) catalyst; and the preparation method comprises the following steps: firstly, mixing a solution of 1-vinyl-3-propylamino imidazolium bromide with azobisisobutyronitrile to obtain a resulting mixture, performing a polymerization reaction on the resulting mixture to obtain an amino-functionalized poly(ionic liquid), and then mixing the amino-functionalized poly(ionic liquid) with zinc chloride to obtain the supramolecular poly(ionic liquid) catalyst.

5. A preparation method for a rigid non-isocyanate polyurethane foam, comprising the following steps:

1) reacting a rigid epoxide with carbon dioxide under a presence of a catalyst to obtain a rigid cyclic carbonate;

2) reacting the rigid cyclic carbonate with a rigid diamine to obtain a rigid non-isocyanate polyurethane; and 3) Mixing the rigid non-isocyanate polyurethane with a foaming agent for foaming to obtain a rigid non-isocyanate polyurethane foam;

wherein in step 1), the catalyst is a supramolecular poly(ionic liquid) catalyst; and the preparation method comprises the following steps: firstly, mixing a solution of 1-vinyl-3-propylamino imidazolium bromide with azobisisobutyronitrile to obtain a resulting mixture, performing a polymerization reaction on the resulting mixture to obtain an amino-functionalized poly(ionic liquid), and then mixing the amino-functionalized poly (ionic liquid) with zinc chloride to obtain the supramolecular poly(ionic liquid) catalyst.

6. The preparation method for the rigid non-isocyanate polyurethane foam according to claim 5, wherein the mass ratio of the 1-vinyl-3-propylamino imidazolium bromide to the azobisisobutyronitrile is 100:(1-3), the molar ratio of the 1-vinyl-3-propylamino imidazolium bromide to the zinc chloride is 1:(1-4), and the molar concentration of the solution of 1-vinyl-3-propylamino imidazolium bromide is 0.5-2 mol/L; and the polymerization reaction is performed at a temperature of 60-100° C. for 8-12 h.

7. The preparation method for the rigid non-isocyanate polyurethane foam according to claim 6, wherein in step 2), the molar ratio of the rigid cyclic carbonate to the rigid diamine is (0.1-3):1, and the reacting is performed at a temperature of 25-70° C. for 0.5-3 h.

8. The preparation method for the rigid non-isocyanate polyurethane foam according to claim 6, wherein the rigid diamine comprises one or more of p-phenylenediamine, hexanediamine, ethylenediamine, isophorone diamine, p-aminodiphenylmethane, p-aminodiphenylethane, 1,5-diaminopentane, and diaminodiphenylmethane.

9. The preparation method for the rigid non-isocyanate polyurethane foam according to claim 8, wherein in step 3), the molar ratio of the foaming agent to the rigid diamine is (0.01-0.5):1, and the foaming is performed for 1-5 h at a temperature of 20-70° C.

10. The preparation method for the rigid non-isocyanate polyurethane foam according to claim 9, wherein the foaming agent comprises one or more of cyclopentane, isopentane, carbon dioxide, sodium bicarbonate, polymethylhydrosiloxane, and pentafluorobutane.

11. The preparation method for the rigid non-isocyanate polyurethane foam according to claim 7, wherein the rigid diamine comprises one or more of p-phenylenediamine, hexanediamine, ethylenediamine, isophorone diamine, p-aminodiphenylmethane, p-aminodiphenylethane, 1,5-diaminopentane, and diaminodiphenylmethane.

* * * * *